July 3, 1956  E. P. D'AZZO  2,752,992
CANOPY ASSEMBLY UNITS
Filed June 10, 1952
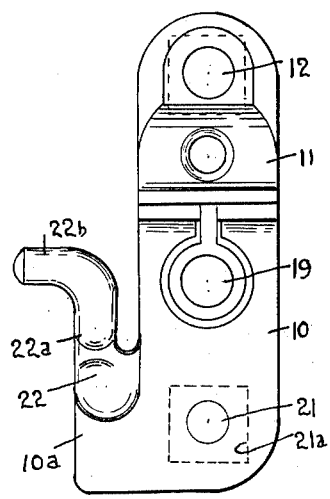
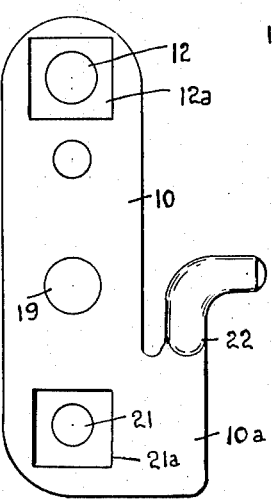
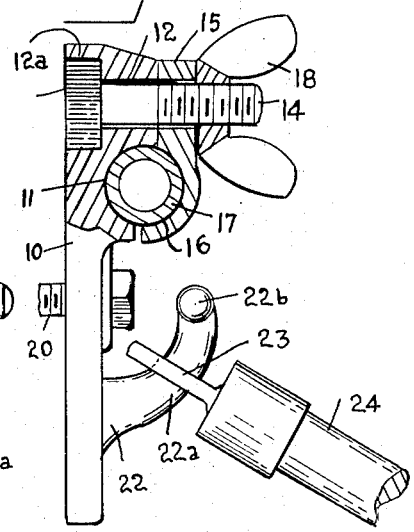
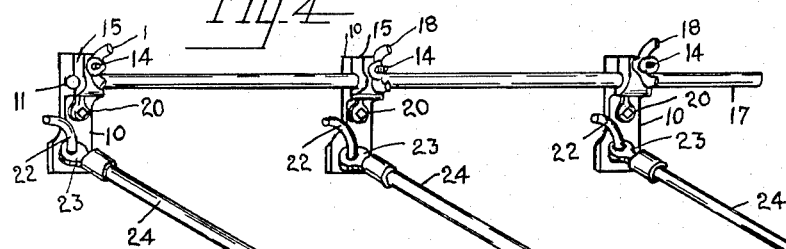
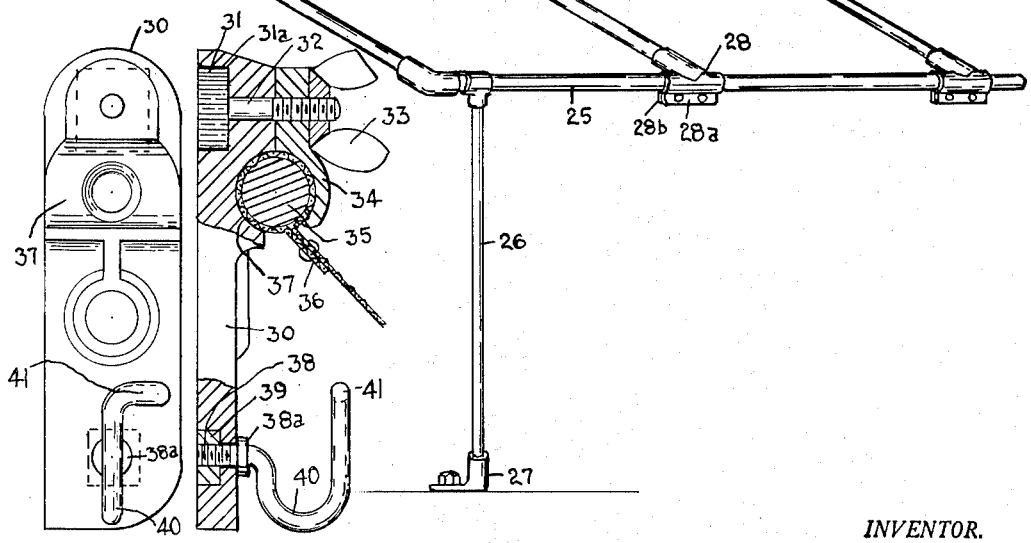
INVENTOR.

United States Patent Office 2,752,992
Patented July 3, 1956

2,752,992

CANOPY ASSEMBLY UNITS

Errol P. D'Azzo, Brooklyn, N. Y.

Application June 10, 1952, Serial No. 292,702

3 Claims. (Cl. 160—77)

This invention relates to an improved support for a canopy pipe frame, and particularly to a bracket constructed to clamp a head rod and to provide a normally open integral hook for permitting the quick coupling of the horizontal frame rod, by the positioning of a terminal connecting eye thereon.

Another object of the invention is to provide a wall bracket for this assembly, having a bolt for clamping the head rod with a head which is received by a rear opening socket of the bracket, and which prevents the turning of the bolt head in the socket, a rod clamping bar mounted on the bolt and provided with a terminal rod holding jaw, and a nut threaded on the bolt shank against the clamping bar to force the clamping bar into pressure engagement with a head rod.

A further object of the invention is to provide a holding bracket for this assembly with an integral hook projecting outwardly from the bracket and having an offset terminal portion disposed to provide a terminal stop to prevent accidental separation of a connecting rod eye mounted on the hook, the hook being so shaped that a 90 degree twist locks the eye against lateral movement and against a disengaging upward movement with respect to the bracket.

With the above and other objects in view the invention comprises certain new and useful constructions, combinations and arrangements of parts, clearly described in the following specifications and fully illustrated in the drawings, in which:

Fig. 1 is a side elevation, shown partly in vertical section, of the bracket, showing a terminal rod connecting eye mounted on the hook of the bracket.

Fig. 2 is a front elevation of the bracket, showing the head rod clamping bar removed.

Fig. 3 is a rear end view thereof.

Fig. 4 is an isometric view showing a portion of a canopy frame constructed with the use of my improved bracket.

Fig. 5 is a front elevation of a modified form of the bracket, wherein the hook is made separate from the bracket plate, showing the clamp bar and screw unit removed.

Fig. 6 is a vertical sectional view thereof, showing the fabric covered head rod in clamped position, and the side view of the combined hook and bolt.

Referring to the accompanying drawings, which illustrate the practical embodiment of my invention, 10 designates the body of a bracket, which may be in the form of a metal casting or forging, and which comprises the head rod receiving transverse groove 11, and the bolt hole 12, located directly above the groove or seat 11, and extending from the back to the front of the body or plate 10.

The rear end of the bolt hole 12 is enlarged to provide a square socket 12a for receiving a bolt head, and has sufficient depth for this purpose. In this socket 12a the square head of the threaded bolt shank 14 is inserted, so that the shank 14 projects forwardly through the hole 12.

On the threaded shank 14 the clamping bar 15 is mounted, and this bar is formed with a concave terminal jaw 16 to engage the head rod 17, and on the shank 14 a wing or other nut 18 is threaded against the clamping bar 15 to develop pressure on the terminal jaw 16, to hold the head rod 17 snugly seated in the groove 11.

The body or plate 10 is formed with a bolt or screw receiving hole 19, located below the groove 11, through which a bolt or screw 20 may be extended for mounting the bracket on a building wall or store front. Below the bolt or screw hole 19 another screw hole 21 is formed, to receive a screw threaded into the building wall or service board mounted on the building wall or store front.

Formed integral with the body or plate 10 is an S-shaped holding hook arm 22, which projects upwardly from an extended portion 10a of the body or plate, near the lower end thereof, and laterally thereof, thus providing the upstanding shank portion 22a and the terminal offset portion 22b, which provides a stop means to oppose upward accidental movement of the terminal connecting eye 23 of the horizontal frame bar or pipe 24.

In erecting a canopy frame, a plurality of similar brackets 10 are mounted along a common horizontal line, so that the hook arms 22 will be in a common horizontal plane. The successive horizontal frame bars 24 of the canopy frame are then hooked on the hook arms, by means of a 90 degree twist of their connecting terminal eyes 23. The front horizontal bar 25 of the canopy frame is supported by vertical post bars 26, anchored by the foot sockets 27.

When the horizontal frame bars 24 are in place any tendency of the terminal connecting eyes which are in engagement with the shank portions 22a to rise on the hook arms 22 will be limited by the terminal stops 22b against which the eyes are wedged, and any tendency of the eyes to move laterally is prevented by the snug engagement with shank portions 22a.

When it becomes necessary or desirable to dismantle the canopy frame, the anchor sockets may be removed, and then the terminal eyes 23 lifted from the hook arms, thus disconnecting the horizontal frame bars from the brackets. The head rod 17 is used for holding the fabric canopy cover in place, and by releasing the clamping bars this head rod 17 may be entirely withdrawn.

The combination in a single bracket of the head rod clamp and the frame bar holding hook arm, permits of the quick and accurate alignment of all brackets in a common horizontal plane, to establish the hanging level of the canopy frame and canopy, using unskilled labor and obtaining high class installation.

The front horizontal bar 25 is coupled to the connecting horizontal bar 24 by means of the split fitting 28, comprising the main fitting section 28a and the detachable fitting section 28b. The separation of these sections permits the assembly of the horizontal pipe or bars.

This invention develops from the great difficulty of assembling the frame of a canopy with the wall connectors. At present it is the prevailing practice to make the assembly by using a high step ladder. The higher the installation of the wall supports the higher must be the step ladder. The task of connecting the horizontal frame parts with the wall supports from a high step ladder is slow and often unsatisfactory. Making high connections from a step ladder usually calls for the use of a man on the ladder and a man on the ground to lift the parts to the man on the ladder. Should one of the parts being connected drop to the side walk time is lost in finding this part and in raising it to the ladder worker.

Many of the canopy and similar installations are supported from 10 to 12 feet above the side walk, and work from a ladder of sufficient height to support a man to make such connections entails a high risk and carries with it high trade wages. By means of the hook and its terminal stop the eye of a rafter bar or pole may be connected on the hook by one man from a ground position, by a quick 90 degree twist, and when connected will effectively resist displacement by wind action, due to the fact that the terminal stop portion of the hook locks or wedges the eye and thus arrests upward movement of the rafter eye. Unhooking from the ground is also easily accomplished by a reverse twist of the rafter bar or pole. In this way considerable labor expense is avoided in installation, and accidents from use of high ladders eliminated.

Referring to Figs. 5 and 6, 30 designates a bracket plate or casting, having a socket 31a formed in its rear side to receive the square head 31 of the bolt shank 32, on which the wing nut 33 is threaded against the clamp bar or cap 34 to hold the head rod 35 and its fabric covering 36 under pressure, against the seat 37 formed in the casting across the plate 30, as in the construction shown in Figs. 2 and 1.

The casting plate 30 is also formed with a socket 39a in its rear side in which the square nut 39 is nested. This nut is engaged by the threaded shank 38, which is formed with an integral collar 38a to engage the frontal face of the casting plate 30. The shank 38 carries an S-shaped hook having an upstanding shank portion 40 formed thereon and provided with a lateral terminal stop 41, offset from plate 30, to prevent upward displacement of an eye mounted on the hook, and connected with the usual eye of a rafter bar.

In this construction the safety hook, which provides means for coupling the rafter bar from the ground, ten or twelve feet below the bracket, is formed separately from the casting, so that a defective hook may be readily replaced, and the casting confined to the plate and the remaining features disclosed. In this construction the hook is provided with a body curve, which extends below the collar 38a, so that the eye of the rafter rides normally below the collar, and has greater relative play thereon. As the hook and its shank is preferably made of steel with high tensional strength, it can be forged or formed from formed rod or wire stock, and made with a smaller diameter, due to this fact.

When the brackets are mounted in place, all of the holding bolts are secured against loss or displacement, which form part of the head rod holding system, and each head of these bolts is secured against relative turning when the wing or other nuts are screwed thereon to clamp the rod in place.

My invention saves time in the erection of awnings, insures that better looking installations will be completed at lower costs.

It is understood that various changes in the details of construction, their combination and arrangement may be carried out in reducing the invention to successful commercial use, without departing from the spirit of the invention, as defined by the claims hereof.

Having described my invention I claim as new and patentable:

1. A bracket for canopies and the like having rafters, comprising a body plate having a rod receiving socket disposed across the plate and a bolt supporting portion, and a hook on the body plate for engaging an eye of a rafter, said hook having an outwardly extending shank portion and a terminal portion, said terminal portion being outwardly offset from said plate, said hook being so shaped that said eye must be rotated 90 degrees to effect engagement with said shank and the eye is then locked against outward and upward movements with respect to said plate by said terminal portion of said hook.

2. The mounting bracket defined in claim 1, wherein said hook is detachably mounted on the bracket.

3. The mounting bracket defined in claim 1, wherein said terminal portion is disposed substantially parallel with said plate.

References Cited in the file of this patent

UNITED STATES PATENTS

| | | |
|---|---|---|
| 430,479 | Kregel | June 17, 1890 |
| 1,813,525 | Astrup | July 7, 1931 |
| 2,157,717 | Munson | May 9, 1939 |
| 2,373,574 | Larson | Apr. 10, 1945 |